April 19, 1966     J. L. DREISZIGER     3,246,717
MOTOR VEHICLE SUSPENSION
Filed April 6, 1964     2 Sheets-Sheet 1
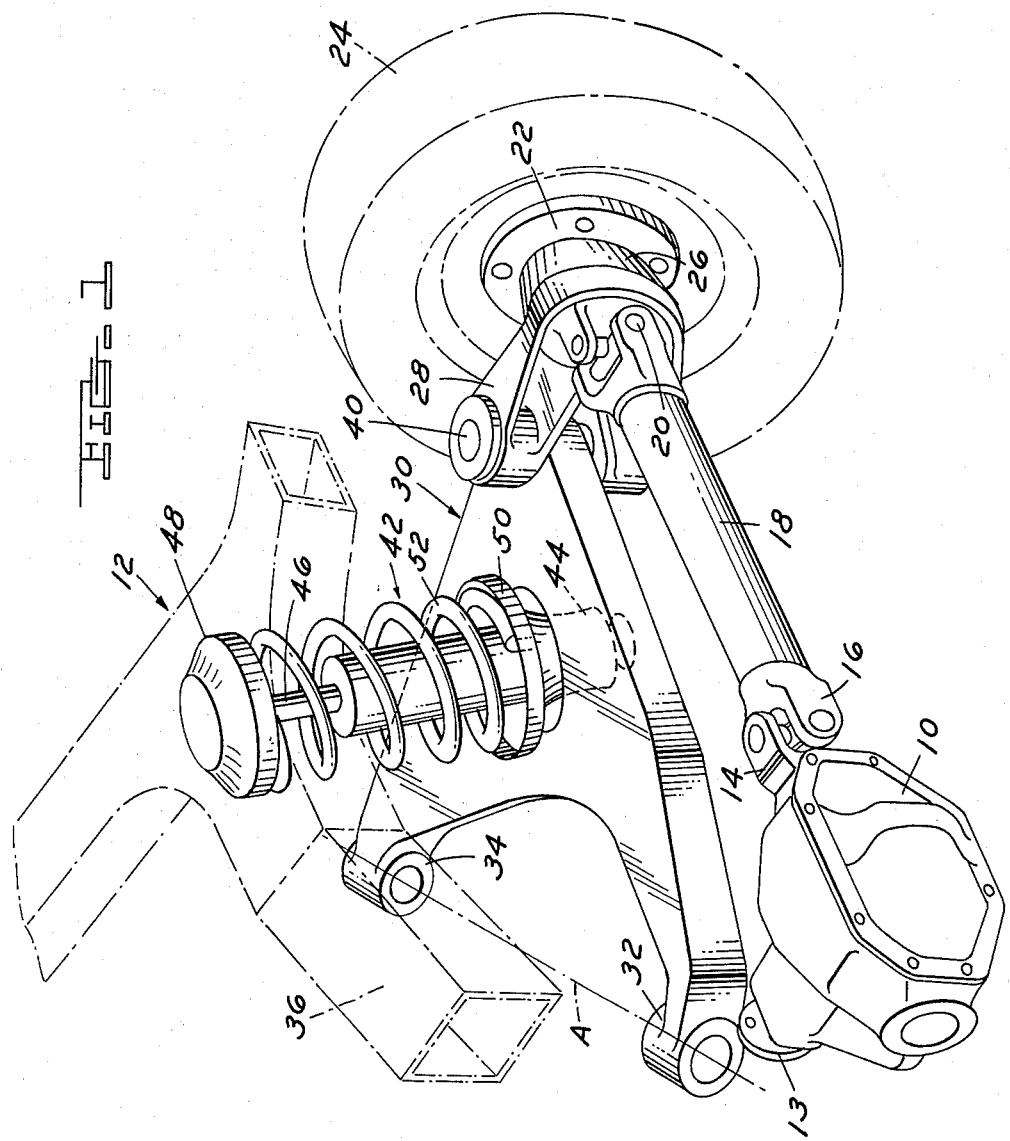
JOZSEF L. DREISZIGER
INVENTOR
John R. Paulkner
Clifford L. Sadler
ATTORNEYS

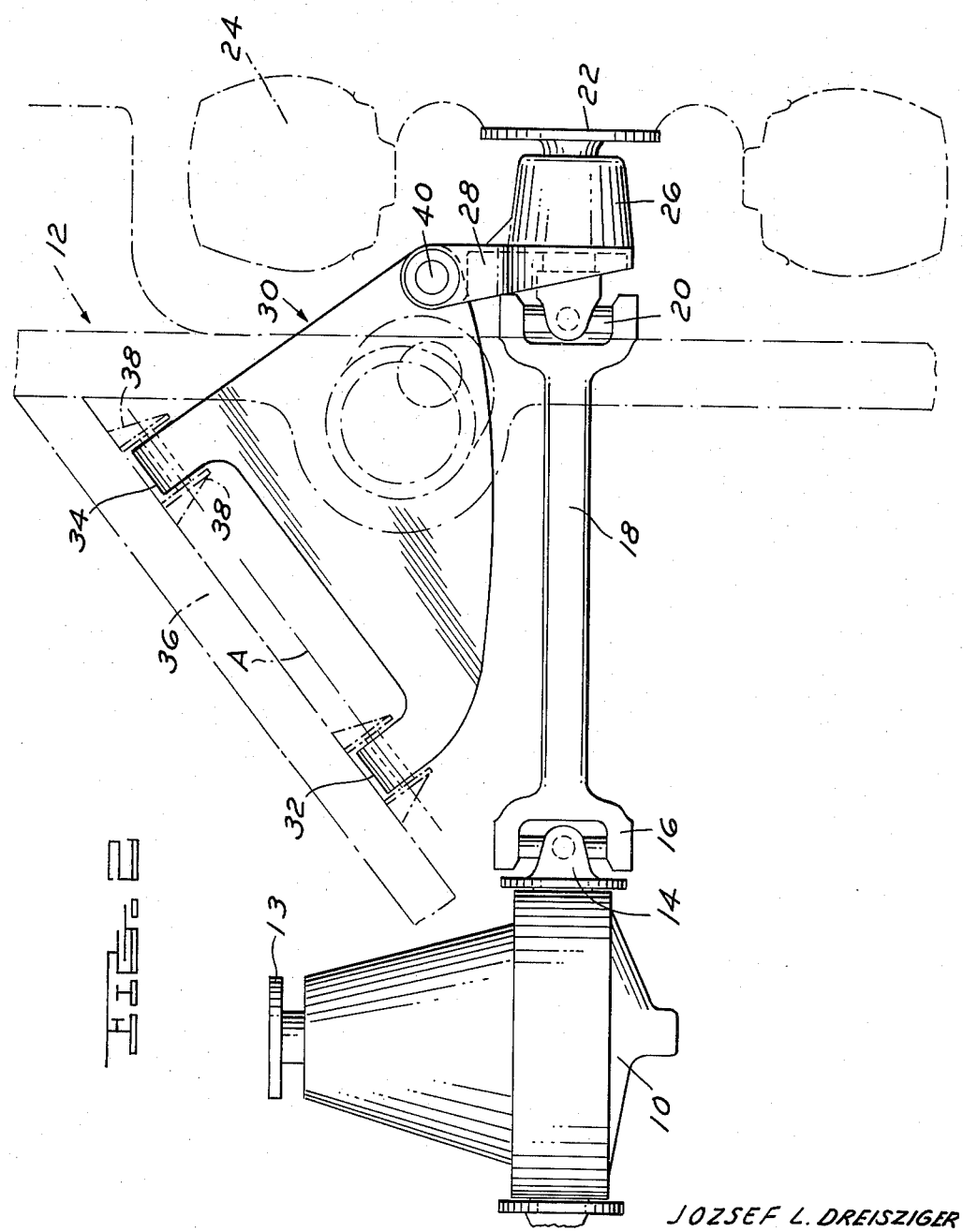
JOZSEF L. DREISZIGER
INVENTOR
John R. Faulkner
Clifford L. Sadler
ATTORNEYS United States Patent Office 3,246,717
Patented Apr. 19, 1966

3,246,717
MOTOR VEHICLE SUSPENSION
Jozsef L. Dreisziger, Basildon, Essex, England, assignor to Ford Motor Company, Dearborn, Mich., a corporation of Delaware
Filed Apr. 6, 1964, Ser. No. 357,560
Claims priority, application Great Britain, Apr. 20, 1963, 15,659/63
6 Claims. (Cl. 180—73)

This invention relates generally to suspension systems for motor vehicles, and more particularly to an independent suspension for driving wheels.

According to the presently preferred embodiment of this invention, a motor vehicle independent suspension has a fixed length driving axle shaft that is connected at its outer end by a universal joint to a road wheel. The inner end of the shaft is connected by a similar joint to a frame mounted differential gear unit for swinging movement in a generally vertical plane. The wheel is supported and positioned by a wheel support arm that has two spaced apart pivot portions attached to the sprung mass of the vehicle along a pivot axis that is inclined to the longitudinal direction of the vehicle but not so inclined as to intersect the connection at the inner end of the fixed length axle shaft.

Since the wheel support arm and the axle shaft do not have a common pivot axis, means must be provided to accommodate the mismatch in the jounce and rebound paths of these members. According to this invention, an extension is provided on the wheel bearing housing and this extension is connected to the end of the wheel support arm by a pivotal connection having a vertical axis.

Steering and wheel camber change characteristics can be readily modified to suit vehicle design requirements by changing the position of the inclined pivot axis and/or the position and length of the fixed length shaft. The spacing of the two pivot portions of the wheel support arm determines the load distribution on the structure of the sprung mass. In order to achieve good load distribution and stability along a longitudinal axis, particularly under cornering conditions, the two pivot portions should be widely spaced apart.

The stability of the suspension about a transverse axis is determined to a large degree by the construction of the joint where the wheel support arm is joined to the extension of the wheel bearing housing. In order to give good stability to the suspension about such an axis, the pivot joint should be of rugged construction and should be of substantial vertical dimension.

The stability of the suspension about a vertical axis is determined by the spacing of the vertical pivot from the center of the wheel and also the spacing between the connection at the inner end of the fixed length axle shaft and the outer attachment of the wheel support arm to the sprung mass. The greater are these spacings, the greater is the stability of the suspension about the vertical axis.

The invention is hereinafter particularly described with reference to the accompanying drawings in which:

FIGURE 1 is a rear perspective view of an independent suspension for a driving wheel constructed according to the present invention; and FIGURE 2 is a top plan view of the suspension of FIGURE 1.

Referring now to the drawings for a more detailed understanding of the present invention, FIGURE 1 discloses a rear suspension system for a motor vehicle having a differential gear unit 10 rigidly secured to a vehicle frame 12 by bracket means (not shown). The differential 10 receives driving torque at its forward end 13 and distributes it through left and right output members 14. The power output member 14 is connected by a universal joint 16 to a fixed length axle shaft 18. An outer universal joint 20 connects the axle shaft 18 to the hub 22 of the road wheel 24. The hub 22 is journalled in a wheel bearing housing 26. The wheel bearing housing 26 is provided with a bifurcated extension 28.

A suspension arm 30 having a generally triangular shape is provided. The suspension arm 30 has spaced apart forward portions 32 and 34 that are connected to a component 36 of the frame 12. A pair of brackets 38 extend from the cross member 36 to permit the portion 34 of the suspension arm 30 to be attached to the sprung mass by a resilient bushing or other convenient pivotal device. The portion 32 is similarly connected to the frame member 36. The portions 32 and 34, together with their connection to the brackets of the frame member 36, define a pivot axis A. It is important to note that the pivot axis A does not intersect the center of the inner universal joint 16 (FIGURE 2).

The rear corner of the triangular shaped wheel support arm 30 is connected to the bifurcated extension 28 of the wheel housing 26 by a vertical pivot pin 40.

The frame 12 is supported on the suspension arm 30 by a shock absorber and spring unit 42. The unit 42 comprises a telescopic shock absorber having one of its parts 44 connected to suspension arm 30 and the other of its parts 46 connected to a spring seat 48 that is secured to the frame 12. An annular spring seat 50 is secured to the body portion of the shock absorber part 44 and secures the lower end of the coil spring 52 in position about the shock. The upper end of the spring 52 is seated in the upper spring seat 48. Thus, this structure resiliently supports the sprung mass on the wheel support arm 30 and the road wheel 24.

Since the half shaft 18 is of fixed length and the suspension arm 30 has a fixed pivot axis that does not coincide with the inner pivot 16 of the shaft 18, jounce and rebound movement of the wheel will be accompanied by a slight pivotal movement of the wheel bearing housing 26 about the vertical pivot pin 40. Such pivotal movement about the pin 40 will effect the steering or toe-in angle of the wheel 24.

Under static load conditions, the axle shaft 18 extends downwardly and outwardly from the differential 10. Thus, when the wheel 24 moves upwardly in jounce, it will also be moving slightly outwardly because the outer joint 20 is traversing an arcuate path about the inner universal joint 16. Pivotal movement will occur about the pivot pin 40 in the direction increasing the toe-in angle of the wheel 24.

The wheel 24 is provided with a preset amount of toe-in under static conditions. When the wheel 24 moves in rebound from its static position, the amount of toe-in will be decreased. This results from the fact that the axle 18 will be swinging downwardly about the inner universal joint 16 causing the outer joint 20 to move inwardly as well as downwardly along an arcuate path. This will pull the wheel hub 22 and bearing housing 26 inwardly about the pivot bolt 40.

The amount of toe-in produced at the wheel 24 during rebound movement relative to a static load condition is determined by the angle of inclination of the pivot axis A and by the amplitude of the movement for the suspension arm 30. As a consequence, pivotal movement of the wheel support member 28 about the generally vertical pivot bolt 40 is effected.

The inclination of the axis A also determines camber change occurring at the road wheel for a given amplitiude of pivotal movement of the arm 30. By a suitable choice of inclination of the axis A, a desired wheel camber change can be related to the wheel steer characteristic changes.

In order to achieve good load distribution on the chassis frame 36 and provide good stability to the suspension along a longitudinal axis under cornering conditions, the two pivot portions 32 and 34 should be widely spaced apart along the inclined pivot axis A.

Stability of the suspension about a transverse axis is determined by the vertical length of the pivot bolt 40 connecting the portion 28 of the wheel bearing housing 26 and the suspension arm 30. This connection should be as long as possible to achieve good lateral stability.

The stability of the suspension about a vertical axis is determined by the spacing of the pivot bolt 40 from the center of the wheel hub 22 and the spacing between the inner universal joint 16 and the outer pivotal attachment portion 34 of arm 30. The vertical stability of the suspension improves as these spacings are increased.

As above described, the suspension is designed to produce understeer at the road wheel. The suspension, however, can be designed to give an oversteer characteristic if desired. Modifications and alterations of this invention may occur to those skilled in the art. But such improvements will come within the scope and spirit of the following claims.

I claim:

1. A vehicle suspensoin system having a frame, a wheel, means constructed for positioning said wheel laterally with respect to said frame, a suspension arm pivotally connected to said frame, a wheel support member rotatably supporting said wheel, said member having a portion pivotally connected to said arm by means having a vertical pivot axis, said vertical pivot axis being longitudinally displaced from the axis of rotation of said wheel.

2. A vehicle suspension system having a sprung mass, a road wheel, an elongated member connected to said sprung mass and to said wheel, a suspension arm pivotally connected to said sprung mass, a wheel support member rotatably supporting said wheel, said wheel support member having a portion pivotally connected to said suspension arm, said last mentioned pivotal connection having a generally vertical pivot axis, said vertical pivot axis being longitudinally displaced from the axis of rotation of said road wheel.

3. A vehicle suspension system having a frame, a driving wheel, driving means constructed for driving said wheel and positioning said wheel laterally with respect to said frame, a suspension arm pivotally connected to said frame, a wheel bearing housing rotatably supporting said wheel, said housing having a portion connected to said arm by means having a vertical pivot axis, said vertical pivot axis being longitudinally displaced from the axis of rotation of said driving wheel.

4. A vehicle suspension system having a sprung mass, a road wheel, a laterally extending elongated member pivotally connected to said sprung mass and to said wheel, a suspension arm pivotally connected to said sprung mass, a wheel support member rotatably supporting said wheel, said wheel support member having an extension pivotally connected to said suspension arm, said last mentioned pivotal connection having a generally vertical pivot axis, said vertical pivot axis being longitudinally displaced from the axis of rotation of said road wheel.

5. A vehicle suspension system having a frame, a differential gear unit secured to said frame, a driving wheel laterally spaced from said gear unit, an axle shaft, an inner universal joint connecting said shaft to the output of said gear unit, an outer universal joint drivingly connecting said shaft to said wheel, a suspension arm pivotally connected to said frame about an axis displaced from said inner universal joint, a wheel bearing housing rotatably supporting a portion of said wheel, said housing having an extension pivotally connected to said suspension arm, said last mentioned pivotal connection having a generally vertical pivot axis, said vertical pivot axis being longitudinally displaced from the axis of rotation of said driving wheel.

6. A vehicle suspension system having a frame, a differential gear unit secured to said frame, a driving wheel laterally spaced from said gear unit, a laterally extending axle shaft of fixed length, an inner universal joint connecting the inner end of said shaft with the output of said differential gear unit, an outer universal joint drivingly connecting the outer end of said shaft to said wheel, a suspension arm of generally triangular shape having a pair of spaced apart pivot portions pivotally connected to said frame about an axis displaced from the center of said inner universal joint, said wheel having a wheel bearing housing rotatably supporting said wheel, said housing having a forward extension, vertical pivot means connecting said extension and said suspension arm, said vertical pivot means being longitudinally displaced from the axis of rotation of said driving wheel.

References Cited by the Examiner

UNITED STATES PATENTS

| 1,711,881 | 5/1929 | Fornaca | 180—73 X |
| 2,775,307 | 12/1956 | Hill | 180—73 X |

FOREIGN PATENTS 920,994 3/1963 Great Britain.

BENJAMIN HERSH, *Primary Examiner.*

E. E. PORTER, *Assistant Examiner.*